(12) United States Patent
Sakakura

(10) Patent No.: US 6,868,430 B2
(45) Date of Patent: Mar. 15, 2005

(54) ARITHMETIC UNIT FOR CORRECTING DETECTION OUTPUT IN WHICH CORRECTED OPERATION OUTPUT IS SENSITIVE TO MECHANICAL FACTORS

(75) Inventor: Youtaro Sakakura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 555 days.

(21) Appl. No.: 10/108,525

(22) Filed: Mar. 27, 2002

(65) Prior Publication Data

US 2002/0169807 A1 Nov. 14, 2002

(30) Foreign Application Priority Data

Mar. 30, 2001 (JP) ........................ 2001-097877

(51) Int. Cl.$^7$ ................ G06J 1/00; G06F 7/00
(52) U.S. Cl. ........................... 708/3; 708/207
(58) Field of Search .................. 708/3, 207, 671; 340/146.2

(56) References Cited

U.S. PATENT DOCUMENTS

| | | | |
|---|---|---|---|
| 4,841,209 A | 6/1989 | Poumakis | |
| 5,278,558 A | 1/1994 | Roth | |
| 5,345,235 A | 9/1994 | Babcock | |
| 5,425,131 A | * 6/1995 | Basehore | 706/8 |
| 5,748,672 A | * 5/1998 | Smith et al. | 375/226 |
| 6,158,887 A | 12/2000 | Simpson | |
| 6,240,381 B1 | * 5/2001 | Newson | 704/214 |
| 2004/0136379 A1 | * 7/2004 | Liao et al. | 370/395.21 |

FOREIGN PATENT DOCUMENTS

JP 7-319618 12/1995

* cited by examiner

*Primary Examiner*—Tan V. Mai
(74) *Attorney, Agent, or Firm*—Brinks Hofer Gilson & Lione (57) ABSTRACT

An arithmetic unit for correcting a detection output of a detector for a mechanical error of the detector in accordance with a predetermined input/output characteristic (straight line) is provided. When a digital output of the detector exceeds an upper limit value stored in a main memory, the digital output becomes a new upper limit value. From a virtual line which passes through the new upper limit value and which is parallel to the straight line, a new lower limit value is obtained. A corrected operation output is obtained in accordance with a new input/output characteristic of the detector based on the new upper limit value and the new lower limit value. Thus, the correction accuracy is improved.

8 Claims, 5 Drawing Sheets

ARITHMETIC UNIT FOR CORRECTING DETECTION OUTPUT IN WHICH CORRECTED OPERATION OUTPUT IS SENSITIVE TO MECHANICAL FACTORS

BACKGROUND OF THE INVENTION

1. Field of the Invention

The present invention relates to arithmetic units for correcting a detection output from a detector in accordance with a linear input/output characteristic. More particularly, the present invention relates to an arithmetic unit, for correcting a detection output, in which a corrected operation output is sensitive to mechanical factors.

2. Description of the Related Art

There are various types of detectors which generate a detection output having a linear input/output characteristic. These detectors include a rotating-type or sliding-type variable resistor and a magnetic detector such as a Hall element.

An analog signal output generated by these detectors is converted by an A/D converter into a digital signal output, and the digital signal output is subjected to subsequent processing.

Since a digitally-converted value generated by the A/D converter may contain an error outside the allowable range, the digitally-converted value is generally corrected, and the corrected value is regarded as a detection output of the detector.

The corrected detection output value of the detector can be computed from the following equation (1) wherein the maximum detection output value for the allowable maximum input of the detector is stored as an upper limit value A, the minimum detection output value for the allowable minimum input is stored as a lower limit value B, and a straight line connecting the upper limit value A and the lower limit value B is approximating to a straight line representing the input/output characteristic of the detector:

$$\text{corrected detection output value} = \frac{(\text{detection output}) - (B)}{(A) - (B)} \times (2^n) \quad (1)$$

wherein n is a natural number representing the number of bits of the A/D converter.

For example, when the A/D converter is an eight-bit converter, $2^n$ (the number of discrete levels) is 256. When the A/D converter is a ten-bit converter, $2^n$ is 1024.

When the eight-bit A/D converter is used, the values between the upper limit value A and the lower limit value B are allocated with a resolution of 256 (00 to FF). In accordance with this allocation, the detection output from the detector is converted into one of the values from 00 to FF.

When various types of detectors are influenced by mechanical or structural factors, such as when a rotating resistor is influenced by a mechanical angle error, by a mechanical error between a resistive element and a wiper, or by a change in resistance caused by a temperature change, the input/output characteristic (straight line) of the detector is apt to vary. Specifically, the actual input/output characteristic of the detector may increasingly deviate from the input/output characteristic based on the stored upper limit value A and the stored lower limit value B, and the corrected detection output value of the detector may include a large error. It has been confirmed that the average error range is approximately ±10%.

SUMMARY OF THE INVENTION

In order to solve the foregoing problems, it is an object of the present invention to provide an arithmetic unit, for correcting a detection output of a detector, in which the correction accuracy of the detection output is improved in accordance with an input/output characteristic (straight line) approximating to the actual input/output characteristic of the detector by occasionally updating an initially-stored upper limit value and an initially-stored lower limit value when correcting the detection output of the detector.

According to an aspect of the present invention, an arithmetic unit for allocating a linear analog output obtained from a detector using a predetermined number of discrete levels ($2^n$) is provided. The arithmetic unit includes an A/D converter for converting the analog output from the detector into a digital value (Dx); a memory for storing an upper limit value A and a lower limit value B of the digital value (Dx) as predetermined values; and a controller for performing the following processing steps:

(1) when the digital value (Dx) is A(a1), which exceeds the upper limit value A, updating the upper limit value stored in the memory to A(a1);

(2) computing a virtual lower limit value B(a1) from the upper limit value A(a1) in accordance with the slope of a linear function determined by the preset upper limit value A and the preset lower limit value B and updating the lower limit value stored in the memory to the lower limit value B(a1); and (3) computing an operation output D by calculating the following equation with respect to a subsequently-obtained digital value (Dx):

$$D = (2^n) \times \{Dx - B(a1)\} / \{A(a1) - B(a1)\}.$$

Figure 2:
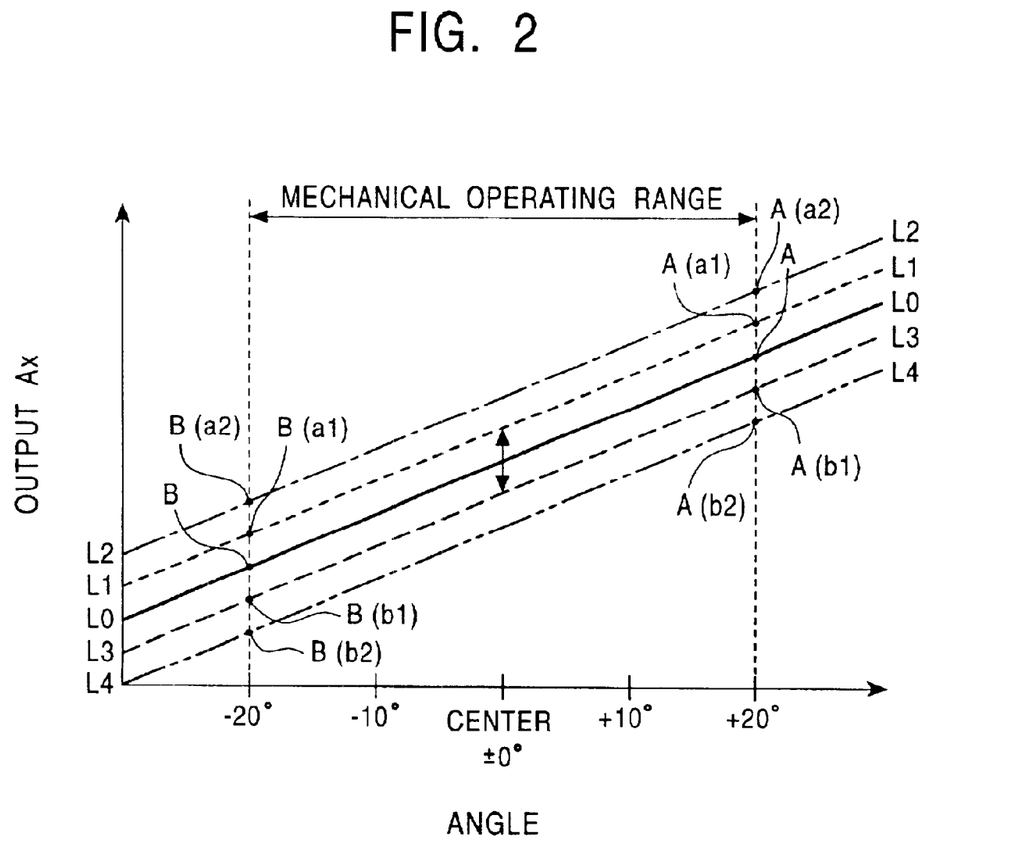
FIG. 2 is a conceptual diagram showing arithmetic processing when the detection output exceeds an upper limit value or falls below a lower limit value.

For example, as shown in FIG. 2, when the detection output Dx of the detector indicates the new upper limit value A(a1) exceeding the upper limit value A stored in the memory (first register), the upper limit value A stored in the memory is overwritten by the new upper limit value A(a1), thus updating the upper limit value. It is assumed that the slope of the straight line remains unchanged after the updating, and a virtual line L1—L1 passing through the new upper limit value A(a1) is assumed. In accordance with the virtual line, a lower upper limit value B(a1) of the detector is obtained. From the computed upper limit value and the computed lower limit value, the digital output from the detector can be corrected in accordance with the virtual line approximating to the actual input/output characteristic of the detector. As a result, an error in the output (computation output) of the detector can be reduced.

Every time the digital value (Dx) exceeds the upper limit value A(a1), the processing steps (1), (2), and (3) may be performed in accordance with a new upper limit value.

For example, as shown in FIG. 2, when the digital value Dx indicates A(a2) exceeding the upper limit value A(a1), a virtual line L2—L2 passing through the new upper limit value A(a2) is assumed, and a lower limit value B(a2) is obtained. Accordingly, arithmetic processing similar to the above can be repeated.

When the digital value (Dx) is B(c1), which falls below the lower limit value B, the following processing steps may be performed:

(4) updating the lower limit value stored in the memory to B(c1); and (5) calculating the following equation using the updated upper limit value and the updated lower limit value:

$$D=(2^n)\times\{Dx-B(c1)\}/\{A(a1)-B(c1)\}.$$

Figure 3:
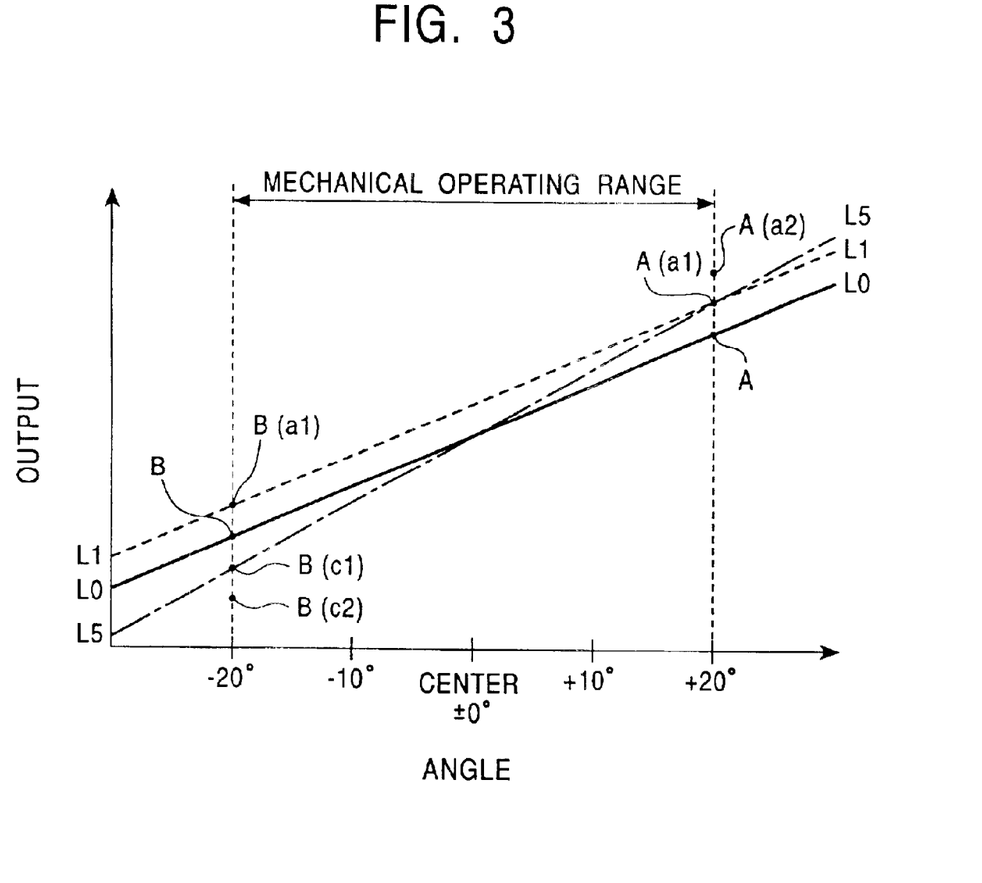
FIG. 3 is a conceptual diagram showing arithmetic processing when the detection output which has exceeded the upper limit value falls below the lower limit value.

For example, as shown in FIG. 3, when the digital value Dx indicates B(c1) falling below the lower limit value B, the lower limit value B is overwritten by the new lower limit value B(c1), and a virtual line L5—L5 passing through the upper limit value A(a1) and the lower limit value B(c1) is assumed. It is assumed that the virtual line represents the input/output characteristic of the detector, and arithmetic processing based on the virtual line is performed. In this case, from the upper limit value A(a1) and the lower limit value B(c1), the detection output can be corrected in accordance with the virtual line approximating to the actual input/output characteristic of the detector.

According to another aspect of the present invention, an arithmetic unit for allocating a linear analog output obtained from a detector using a predetermined number of discrete levels ($2^n$) is provided. The arithmetic unit includes an A/D converter for converting the analog output from the detector into a digital value (Dx); a memory for storing an upper limit value A and a lower limit value B of the digital value (Dx) as predetermined values; and a controller for performing the following processing steps:

(1) when the digital value (Dx) is B(b1), which falls below the lower limit value B, updating the lower limit value stored in the memory to B(b1);

(2) computing a virtual upper limit value A(b1) from the lower limit value B(b1) in accordance with the slope of a linear function determined by the preset upper limit value A and the preset lower limit value B and updating the upper limit value stored in the memory to A(b1); and (3) computing an operation output D by calculating the following equation with respect to a subsequently-obtained digital value (Dx):

$$D=(2^n)\times\{Dx-B(b1)\}/\{A(b1)-B(b1)\}.$$

For example, as shown in FIG. 2, when the detection output Dx of the detector is the new lower limit value B(b1) falling below the lower limit value B stored in the memory (second register), the lower limit value B stored in the memory is overwritten by the new lower limit value B(b1), thus updating the lower limit value. It is assumed that the slope of the straight line remains unchanged after the updating, and a virtual line L3—L3 passing through the new lower limit value B(b1) is assumed. In accordance with the virtual line, an upper limit value A(b1) of the detector is obtained. From the computed upper limit value and the computed lower limit value, the digital output from the detector can be corrected in accordance with the virtual line approximating to the actual input/output characteristic of the detector. As a result, an error in the output (computation output) of the detector can be reduced.

Every time the digital value (Dx) falls below the lower limit value B(b1), the processing steps (1), (2), and (3) may be performed in accordance with a new lower limit value.

For example, as shown in FIG. 2, when the digital value Dx indicates B(b2) falling below the lower limit value B(b1), a virtual line L4—L4 passing through the new lower limit value B(b2) is assumed, and an upper limit value A(b2) is obtained. Accordingly, similar arithmetic processing can be repeated.

When the digital value (Dx) is A(c1), which exceeds the upper limit value A, the following processing steps may be performed:

(4) updating the upper limit value stored in the memory to A(c1); and (5) calculating the following equation using the updated upper limit value and the updated lower limit value:

$$D=(2^n)\times\{Dx-B(b1)\}/\{A(c1)-B(b1)\}.$$

Figure 4:
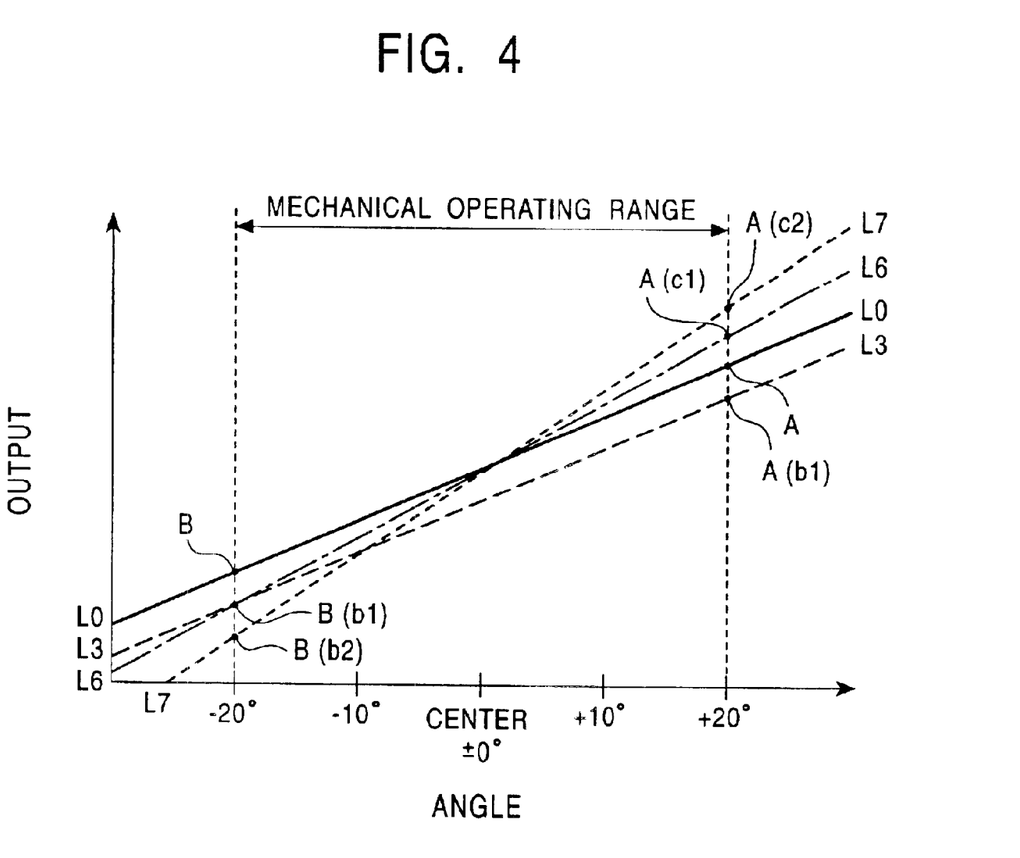
FIG. 4 is a conceptual diagram showing arithmetic processing when the detection output which has fallen below the lower limit value exceeds the upper limit value.

For example, as shown in FIG. 4, when the digital value X indicates A(c1) exceeding the upper limit value A, the upper limit value A is overwritten by the new upper limit value A(c1), and a virtual line L6—L6 passing through the lower limit value B(b1) and the upper limit value A(c1) is assumed. It is regarded that the virtual line L6—L6 represents the input/output characteristic of the detector, and arithmetic processing in accordance with the virtual line L6—L6 is performed. In this case, from the upper limit value A(c1) and the lower limit value B(b1), the detection output can be corrected in accordance with the virtual line approximating to the actual input/output characteristic of the detector.

In a case when A0 represents an actual upper limit value obtained from the A/D converter when an operating range of the detector is at an upper limit and when B0 represents an actual lower limit value obtained from the A/D converter when the operating range of the detector is at a lower limit, the upper limit value A and the lower limit value B stored in the memory are values taking into consideration a predetermined dead zone $\alpha$, whereby A=A0−$\alpha$ and B=B0+$\alpha$. When updating the upper limit value or the lower limit value, an updated value is obtained by subtracting the dead zone $\alpha$ from the detected value, for the upper limit value, or adding the dead zone $\alpha$ to the detected value, for the lower limit value.

Figure 5:
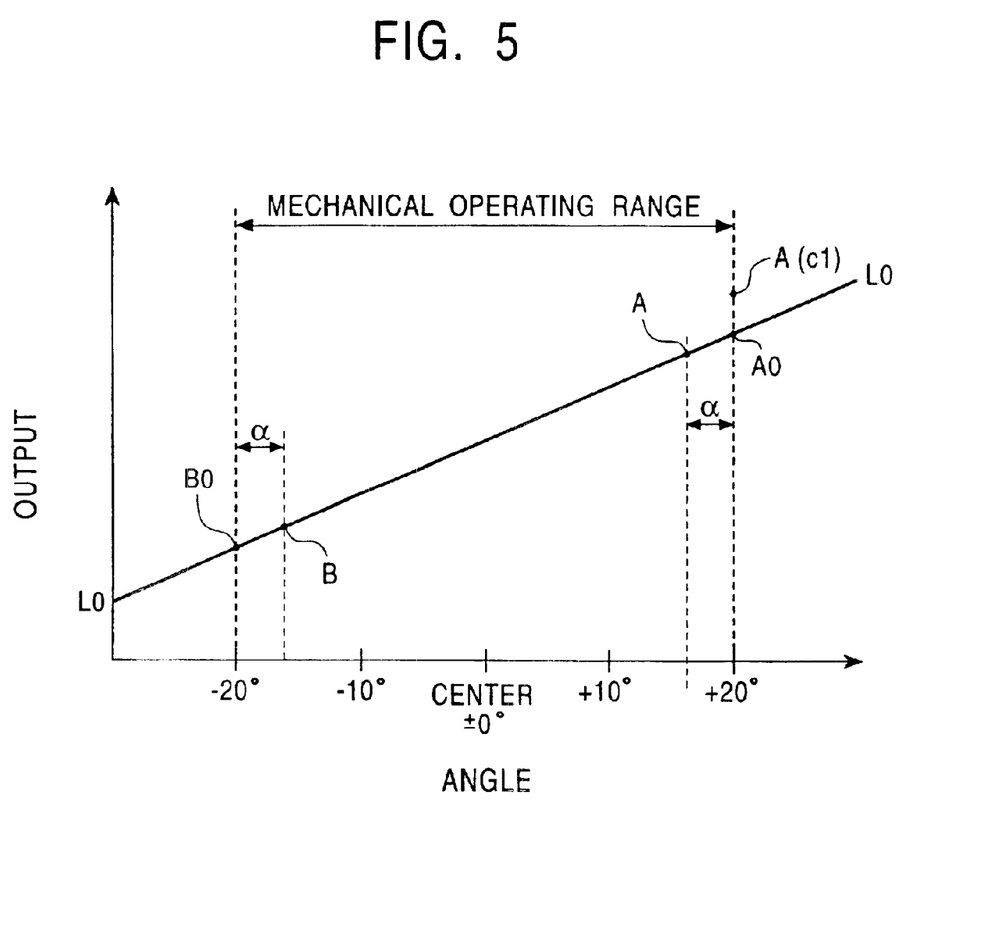
FIG. 5 is a conceptual diagram showing arithmetic processing when dead zones are provided.

For example, as shown in FIG. 5, when the predetermined dead zone $\alpha$ is set inward from the upper limit value A0 and the lower limit value B0 of the mechanical operating range of the detector as the upper limit value A and the lower limit value B for arithmetic processing, the upper limit value A and the lower limit value B can be easily updated. The accuracy of the virtual lines can be improved. Because the detection output can be corrected in accordance with the virtual lines, an error in the output (computation output) of the detector can be further reduced.

DESCRIPTION OF THE PREFERRED EMBODIMENTS

The present invention will become apparent from the following description of preferred embodiments with reference to the accompanying drawings.

Figure 1:
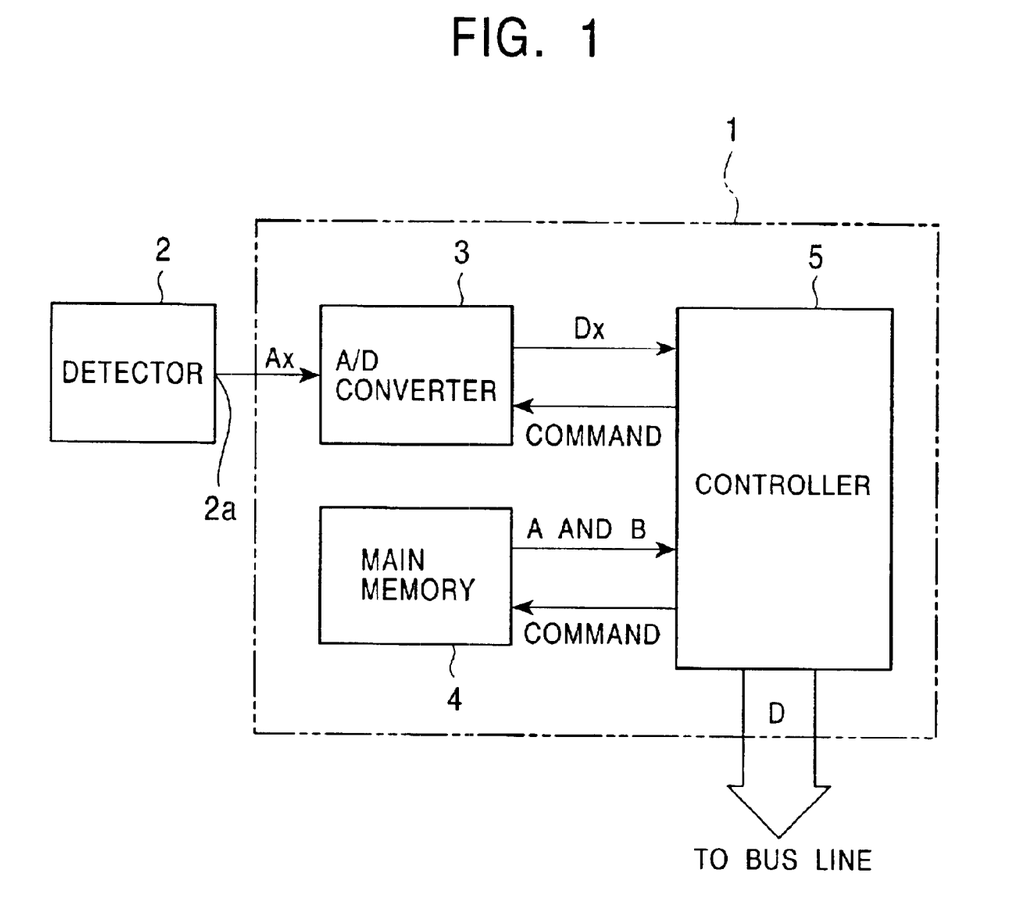
FIG. 1 is a block diagram of an arithmetic unit for correcting a detection output according to an embodiment of the present invention.

FIG. 1 shows an arithmetic unit for correcting a detection output according to the present invention. FIG. 2 shows arithmetic processing when the detection output exceeds an upper limit value or falls below a lower limit value. FIG. 3 shows arithmetic processing when the detection output which has exceeded the upper limit value falls below the lower limit value. FIG. 4 shows arithmetic processing when the detection output which has fallen below the lower limit value exceeds the upper limit value. FIG. 5 shows arithmetic processing when dead zones are provided.

Referring to FIG. 1, an arithmetic unit 1 for correcting a detection output according to the present invention contains an A/D converter 3 connected to a detector 2, a main memory 4, and a controller 5.

The detector 2 can be of any type as long as it has a linear input/output characteristic. For example, the detector 2 can be a rotating-type or sliding-type resistor, a magnetic detector such as a Hall element or a magnetoresistive sensor, or a piezoelectric element such as a PZT (Pb(Zr—Ti)$O_3$) element.

The A/D converter 3 has a function for allocating a predetermined voltage level using a predetermined resolution, such as 256 discrete levels ($2^8$ discrete levels) or 1024 discrete levels ($2^{10}$ discrete levels), and, in accordance with the allocation, converting an analog output Ax of the detector 2 into a digital output Dx. When the output of the detector 2 ranges from 0.5 V to 4.5 V, the range of convertible voltage (operating range) of the A/D converter 3 is 0 V to 5V. In such a manner, the output range of the detector 2 is set to fit into the operating range of the A/D converter 3.

The main memory 4 includes a ROM (Read Only Memory) or a RAM (Random Access Memory).

The controller 5 is formed mainly by a CPU (Central Processing Unit) and contains therein a first register (memory), a second register (memory), and a third register (memory). The controller 5 performs processing control of the A/D converter 3 and the main memory 4 and communication control with external circuits.

The operation of the arithmetic unit 1 for correcting a detection output will now be described.

FIG. 2 shows an input/output characteristic of a rotating-type resistor as an example of the detector 2. When an operation knob (not shown) is operated, the resistance of the rotating-type resistor changes. The horizontal axis represents a rotation angle of the operation knob, and the vertical axis represents an output voltage of an output unit of the operation knob. Specifically, a voltage which is output in proportion to the resistance, which varies in accordance with the rotation of the operation knob, is shown. The center of the detector 2 is set to zero degrees, and the operation knob can be rotated within a range of –20 degrees to +20 degrees around the center. When a voltage of 5 V is applied to the detector 2, and when the operation knob is rotated –20 degrees, an output unit 2a of the detector 2 outputs a lower limit value B (such as 0.5 V). When the operation knob is rotated +20 degrees, the output unit 2a outputs an upper limit value A (such as 4.5 V).

As indicated by the line L0—L0 shown in FIG. 2, the input/output characteristic of the detector 2 is linear (straight line). The detector 2 outputs an analog output Ax which is in proportion to the rotation angle of the operation knob.

The ROM of the main memory 4 stores beforehand the upper limit value A of the detector 2 when the operation knob is rotated +20 degrees and the lower limit value B of the detector 2 when the operation knob is rotated –20 degrees as digital values. The input/output characteristic is indicated by a straight line (line L0—L0) passing through the upper limit value A and the lower limit value B. The upper limit value A and the lower limit value B are stored as initial values of the detector 2 in the main memory 4.

The upper limit value A and the lower limit value B can be averages taken from values obtained by measuring detection outputs of a plurality of detectors 2 of the same type. Alternatively, the upper limit value A and the lower limit value B can be obtained for individual detectors 2 by individually measuring detection outputs of the detectors 2.

When the arithmetic unit 1 with the detector 2 is turned ON, the controller 5 reads the upper limit value A and the lower limit value B from the main memory 4 and stores the upper limit value A and the lower limit value B in the first register and the second register, respectively, in the controller 5.

The controller 5 activates the A/D converter 3 to convert an analog output Ax output from the output unit 2a of the detector 2 into an output (digital value) Dx. The digitally-converted output Dx is stored in the third register in the controller 5. The controller 5 causes the A/D converter 3 to convert an analog output Ax from the detector 2 into a digital output Dx at a predetermined sampling time and overwrites the contents of the third register by the digitally-converted output Dx. This operation is repeated. The contents of the first register, namely, the upper limit value A, and the contents of the second register, namely, the lower limit value B, are each compared with the contents of the third register, namely, the digital output Dx from the detector.

Regardless of the fact that the operation knob of the detector 2 is operated, when the comparison result is within the range of B≦Dx≦A, that is, when the digital output Dx of the detector 2 is greater than or equal to the lower limit value B and less than or equal to the upper limit value A, the controller 5 performs correction by arithmetic processing in accordance with the following equation (2), thus computing an operation output (corrected value) D for the detector 2:

$$\text{operation output } D = \frac{Dx - B}{A - B} \times 2^n \qquad (2)$$

wherein n is a natural number.

When n=8, that is, when the A/D converter 3 is an eight-bit A/D converter, the values between the upper limit value A and the lower limit value B are allocated using a resolution of 256 (00 to FF), and in accordance with the allocation, the output of the detector 2 is converted into one of the values from 00 to FF.

The operation output D is output as a final output value of the detector 2 through a bus line to various external circuits.

In a case when the operation knob of the detector 2 is operated and when the digital output Dx of the detector 2 exceeds the upper limit value A (A<Dx) or when the digital output Dx falls below the lower limit value B (Dx<B), the arithmetic unit 1 performs processing described below.

(1) When A<Dx i) When digital output Dx exceeding upper limit value A is input

For example, as shown in FIG. 2, when the operation knob is rotated +20 degrees and when the digital output Dx is a value (A(a1)) exceeding the upper limit value A (A<Dx= A(a1)), the controller 5 updates the contents of the first register (upper limit value A) by overwriting the contents by the value A(a1), which is the digital output Dx exceeding the upper limit value A, and the value A(a1) is regarded as a new upper limit value. The controller 5 assumes a straight line passing through the new upper limit value A(a1) as a virtual line L1—L1. It is assumed that the slope of the virtual line L1—L1 is the same as that of the straight line L0—L0 representing the initial input/output characteristic of the detector 2.

The controller 5 computes a corresponding lower limit value B(a1) when the operation knob is rotated −20 degrees in accordance with the virtual line L1—L1 and overwrites the contents of the second register (lower limit value B) by the new lower limit value B(a1), thus updating the lower limit value. In accordance with the new upper limit value A, the new lower limit value B, and equation (2), the controller 5 corrects the subsequent digital output Dx output from the detector 2.

When the operation knob is further operated, and when the digital output Dx becomes a value A(a2) exceeding the new upper limit value A(a1), the controller 5 performs processing similar to the above using the new upper limit value A(a2).

Specifically, the controller 5 computes a new lower limit value B(a2) in accordance with the new upper limit value A(a2) and a virtual line L2—L2 passing through the new upper limit value A(a2). The controller 5 overwrites the contents of the first and second registers by the new upper limit value A(a2) and the lower limit value B(a2), thus updating the upper limit value and the lower limit value. In accordance with the new upper limit value A(a2), the new lower limit value B(a2), and equation (2), the controller 5 corrects the subsequent digital output Dx from the detector 2.

The foregoing updating processing is repeated every time the digital output Dx exceeding the upper limit value A stored in the first register is input. Thus, the arithmetic unit 1 can perform correction in accordance with a new virtual line which represents the actual input/output characteristic of the detector 2, and the accuracy of the operation output D can be improved.

ii) When digital output Dx falling below lower limit value B is input

As shown in FIG. 3, in a case when the contents of the first register have been overwritten by the new upper limit value A(a1) and when the contents of the second register have been overwritten by the new lower limit value B(a1) (virtual line L1—L1), when the digital output Dx (=B(c1)) falling below the contents of the second register (B(a1)) is input, the controller 5 performs control processing described below.

The controller 5 overwrites the contents of the second register by the new lower limit value B(c1), assumes a straight line passing through the upper limit value A(a1) and the new lower limit value B(c1) as a virtual line L5—L5, and performs correction in accordance with the new straight line as the input/output characteristic of the detector 2. In other words, the controller 5 corrects the digital output Dx of the detector 2 in accordance with the new upper limit value A(a1), the new lower limit value B(c1), and equation (2). The operation output D is output as a final output of the detector 2 to various external circuits through a bus line.

When the subsequently-detected digital output Dx of the detector 2 exceeds the new upper limit value A(a1) or falls below the new lower limit value B(c1), the upper limit value A(a1) and the lower limit value B(c1) are overwritten by a new upper limit value A(a2) and a new lower limit value B(c2), thus updating the upper and lower limit values. Processing similar to the above is performed in accordance with a virtual line passing through the upper limit value A(a2) and the lower limit value B(c2).

(2) When Dx<B i) When digital output Dx falling below lower limit value B is input In contrast, when the operation knob is operated −20 degrees, and when the digital output Dx is a value (B(b1)) falling below the lower limit value B (B<Dx=B(b1)), the controller 5 performs processing similar to the above around the lower limit value B. Specifically, the controller 5 overwrites the contents of the second register (lower limit value B) by the new lower limit value B(b1). The controller 5 assumes a virtual line L4—L4 passing through the new lower limit value B(b1) (see FIG. 2) and, in accordance with the virtual line L4—L4, computes an upper limit value A(b1) when the operation knob is operated +20 degrees. The controller 5 overwrites the contents of the first and second registers by the new upper limit value A(b1) and the new lower limit value B(b1). In accordance with the new upper limit value A(b1), the new lower limit value B(b1), and equation (2), the controller 5 corrects the subsequently-input digital output Dx.

When the detector 2 outputs B(b2) falling below the new lower limit value B(b1) as a digital output Dx while the operation knob is being operated, processing similar to the above is repeated. A new virtual line L5—L5 is assumed, and a new upper limit value A(b2) is obtained in accordance with the line L5—L5. The contents of the first and second registers are overwritten by the upper limit value A(b2) and the lower limit value B(b2), respectively.

The above updating processing is repetitively performed every time the digital output Dx falling below the lower limit value B stored in the second register is input.

ii) When digital output Dx exceeding upper limit value A is input

As shown in FIG. 4, in a case when the contents of the first register are overwritten by the upper limit value A(b1) and when the contents of the second register are overwritten by the lower limit value B(b1) (virtual line L3—L3), when the digital output Dx (=A(c1)) exceeding the contents of the first register (upper limit value A(b1)) is input, control processing as described below is performed.

The controller 5 overwrites the contents of the first register by the new upper limit value A(c1), assumes a straight line (virtual line L6—L6) passing through the new upper limit value A(c1) and the lower limit value B(b1), and performs correction in accordance with the new virtual line L6—L6 which is regarded as the input/output characteristic of the detector 2. In other words, the digital output Dx of the detector 2 is corrected in accordance with the new upper limit value A(c1), the new lower limit value B(b1), and equation (2). The resulting operation output D is output as a final output of the detector 2 to various external circuits through the bus line.

When the digital output Dx of the detector 2 exceeds the overwritten upper limit value A(c1) and falls below the lower limit value B(b1), the controller 5 again overwrites the upper limit value A(c1) by a new upper limit value A(c2) and the lower limit value B(b1) by a new lower limit value B(b2), thus updating the upper and lower limit values. Processing similar to the above is performed in accordance with a newly assumed virtual line L7—L7 (straight line).

As described above, the use of the arithmetic unit 1 achieves correction in accordance with the input/output characteristic approximating to the actual input/output characteristic of the detector 2. Thus, the accuracy of the operation output (corrected value) D obtained by correcting the digital output Dx of the detector 2 using the upper limit value A and the lower limit value B can be improved.

In particular, when the detector 2 becomes worn as a result of being used over an extended period of time, the internal mechanical characteristics may vary. In such a case, the upper limit value A and the lower limit value B after the variation greatly differ from the initial upper limit value A and the initial lower limit value B stored in the main memory 4. Even in such a case, by performing arithmetic processing using equation 2 in accordance with the new upper limit value A and the new lower limit value B after the updating, the operation output D with respect to the input operation of the detector 2 (the operation of the operation knob) can be obtained in accordance with a proportional distribution based on the new upper limit value A and the new lower limit value B.

When the detector 2 is continuously used, the digital output Dx of the detector 2 more frequently exceeds the upper limit value A and/or falls below the lower limit value B. Accordingly, the accuracy of the operation output D can be improved. The correction operation is performed without being noticed by a user, that is, the correction operation is automatically performed by internal processing of the arithmetic unit 1 while the user is operating the operation knob. Thus, no burden in put on the user.

As the distance in the horizontal axis direction between the upper limit value A and the lower limit value B increases, the more the accuracy of the input/output characteristic (straight line) of the detector 2 improves. Thus, the correction accuracy of the detector 2 is improved. In view of these facts, the initial upper limit value A and the initial lower limit value B stored in the main memory 4 tend to be an upper limit value of the operating range of the detector 2 (for example, digital output Dx when +20 degrees is detected) and a lower limit value of the operating range (digital output Dx when −20 degrees is detected).

In a case when the upper limit value A and the lower limit value B are set to be the limit values (the upper limit value and the lower limit value) of the operating range of the detector 2, the digital output Dx rarely exceeds/falls below the limit values of the operating range particularly when the detector 2 is new. The arithmetic unit 1 cannot sufficiently perform the updating, and it becomes difficult to improve the correction accuracy of the operation output D.

Referring to FIG. 5, A0 represents an actual upper limit value obtained from the A/D converter 3 when the operating range of the detector 2 is at the upper limit, and B0 represents an actual lower limit value obtained from the A/D converter 3 when the operating range of the detector 2 is at the lower limit. Preferably, a dead zone α of a predetermined constant is provided at a lower side of the upper limit value A, and also a dead zone α of a predetermined constant is provided at an upper side of the lower limit value B.

In this case, equation (2) is replaced by equation (3) below, taking into consideration the dead zone a, thus achieving the operation output D of high accuracy:

$$\text{operation output } D = \frac{(Dx)-(A0-\alpha)}{(A0-\alpha)-(B0+\alpha)} \times (2^n) \quad (3)$$

wherein n is a natural number.

In other words, the dead zone α is provided at each of the lower side of the upper limit value A and at the upper side of the lower limit value B. Thus, the upper limit value A is A0−α, and the lower limit value B is B0+α. Accordingly, the upper limit value A can be set to a value less than the actual upper limit value A0 of the detector 2, and the lower limit value B can be set to a value greater than the actual lower limit value B0 of the detector 2. As a result, the digital output Dx more frequently updates the upper limit value A and the lower limit value B. When updating the upper limit value A or the lower limit value B, an updated value can be obtained by subtracting the dead zone α from the detected value, for the upper limit value, or adding the dead zone α to the detected value, for the lower limit value.

What is claimed is:

1. An arithmetic unit for allocating a linear analog output obtained from a detector using a predetermined number of discrete levels ($2^n$), comprising:
   an A/D converter to convert the analog output from the detector into a digital value (Dx);
   a memory to store an upper limit value A and a lower limit value B of the digital value (Dx) as predetermined values; and
   a controller for perform the following processing steps:
   (1) when the digital value (Dx) is A(a1), which exceeds the upper limit value A, updating the upper limit value stored in the memory to A(a1);
   (2) computing a virtual lower limit value B(a1) from the upper limit value A(a1) in accordance with the slope of a linear function determined by the preset upper limit value A and the preset lower limit value B and updating the lower limit value stored in the memory to the lower limit value B(a1); and
   (3) computing an operation output D by calculating the following equation with respect to a subsequently-obtained digital value (Dx):

$$D=(2^n)\times\{Dx-B(a1)\}/\{A(a1)-B(a1)\}.$$

2. The arithmetic unit for correcting the detection output according to claim 1, wherein, every time the digital value (Dx) exceeds the upper limit value A(a1), the processing steps (1), (2), and (3) are performed in accordance with a new upper limit value.

3. The arithmetic unit for correcting the detection output according to claim 1, wherein, when the digital value (Dx) is B(c1), which falls below the lower limit value B, the following processing steps are performed:
   (4) updating the lower limit value stored in the memory to B(c1); and
   (5) calculating the following equation using the updated upper limit value and the updated lower limit value:

$$D=(2^n)\times\{Dx-B(c1)\}/\{A(a1)-B(c1)\}.$$

4. An arithmetic unit for allocating a linear analog output obtained from a detector using a predetermined number of discrete levels ($2^n$), comprising:
   an A/D converter to convert the analog output from the detector into a digital value (Dx);
   a memory to store an upper limit value A and a lower limit value B of the digital value (Dx) as predetermined values; and
   a controller to perform the following processing steps:
   (1) when the digital value (Dx) is B(b1), which falls below the lower limit value B, updating the lower limit value stored in the memory to B(b1);
   (2) computing a virtual upper limit value A(b1) from the lower limit value B(b1) in accordance with a slope of a linear function determined by the preset upper limit value A and the preset lower limit value B and updating the upper limit value stored in the memory to A(b1); and (3) computing an operation output D by calculating the following equation with respect to a subsequently-obtained digital value (Dx):

$$D=(2^n)\times\{Dx-B(b1)\}/\{A(b1)-B(b1)\}.$$

5. The arithmetic unit for correcting the detection output according to claim 4, wherein, every time the digital value (Dx) falls below the lower limit value B(b1), the processing steps (1), (2), and (3) are performed in accordance with a new lower limit value.

6. The arithmetic unit for correcting the detection output according to claim 4, wherein, when the digital value (Dx) is A(c1), which exceeds the upper limit value A, the following processing steps are performed:

(4) updating the upper limit value stored in the memory to A(c1); and (5) calculating the following equation using the updated upper limit value and the updated lower limit value:

$$D=(2^n)\times\{Dx-B(b1)\}/\{A(c1)-B(b1)\}.$$

7. The arithmetic unit for correcting the detection output according to claim 1, wherein, in a case when A0 represents an actual upper limit value obtained from the A/D converter when an operating range of the detector is at an upper limit and when B0 represents an actual lower limit value obtained from the A/D converter when the operating range of the detector is at a lower limit, the upper limit value A and the lower limit value B stored in the memory are values taking into consideration a predetermined dead zone $\alpha$, whereby $A=A0-\alpha$ and $B=B0+\alpha$, and when updating of the the upper limit value and the lower limit value, an updated value is obtained by one of subtracting the dead zone $\alpha$ from the detected value, for the upper limit value, and adding the dead zone $\alpha$ to the detected value, for the lower limit value.

8. The arithmetic unit for correcting the detection output according to claim 4, wherein, in a case when A0 represents an actual upper limit value obtained from the A/D converter when an operating range of the detector is at an upper limit and when B0 represents an actual lower limit value obtained from the A/D converter when the operating range of the detector is at a lower limit, the upper limit value A and the lower limit value B stored in the memory are values taking into consideration a predetermined dead zone $\alpha$, whereby $A=A0-\alpha$ and $B=B0+\alpha$, and when updating one of the upper limit value and the lower limit value, an updated value is obtained by one of subtracting the dead zone $\alpha$ from the detected value, for the upper limit value, and adding the dead zone $\alpha$ to the detected value, for the lower limit value.

* * * * *

UNITED STATES PATENT AND TRADEMARK OFFICE
CERTIFICATE OF CORRECTION

PATENT NO. : 6,868,430 B2
DATED : March 15, 2005
INVENTOR(S) : Youtaro Sakakura

It is certified that error appears in the above-identified patent and that said Letters Patent is hereby corrected as shown below:

Column 10,
Line 17, after "controller" delete "for" and substitute -- to -- in its place.

Column 12,
Line 6, after "when updating" delete "of the the" and substitute -- one of the -- in its place.

Signed and Sealed this

Twenty-second Day of November, 2005

JON W. DUDAS
*Director of the United States Patent and Trademark Office*